Oct. 18, 1949.   J. S. ALLEN ET AL   2,485,469
METHOD AND MEANS FOR DETECTING IONIZATION
Filed Nov. 6, 1946   5 Sheets-Sheet 3

WITNESSES
Ralph Carlisle Smith

INVENTORS
James S. Allen
Bruno B. Rossi
BY

Oct. 18, 1949.　　　　　J. S. ALLEN ET AL　　　　2,485,469
METHOD AND MEANS FOR DETECTING IONIZATION
Filed Nov. 6, 1946　　　　　　　　　　　　　　5 Sheets-Sheet 5

WITNESSES
Ralph Carlisle Smith

INVENTORS
James S. Allen
Bruno B. Rossi
BY

Patented Oct. 18, 1949

2,485,469

UNITED STATES PATENT OFFICE 2,485,469

METHOD AND MEANS FOR DETECTING IONIZATION

James S. Allen and Bruno B. Rossi, Chicago, Ill., assignors to the United States of America as represented by the United States Atomic Energy Commission Application November 6, 1946, Serial No. 708,204

2 Claims. (Cl. 250—83.6)

This invention relates to the detection of atomic and subatomic particles and nuclear radiation and more particularly to systems and component parts thereof for effecting high efficiency detection and counting of the occurrence of such particles at a particular place and time.

It is well known that individual atomic and subatomic particles and/or radiation may be detected when such particles are caused to pass through the volume of a predetermined gas defined by the field between a pair of spaced apart electrodes. The particles in passing through the gas employed in the detecting device cause the production of ion pairs and positively charged ions will be drawn toward the negatively charged electrode, and contrariwise, negatively charged ions and/or electrons will be drawn toward the positively charged electrodes by the action of the electric field existing between said electrodes. It is further well known that such devices may be classified according to the voltage applied to the electrodes. Thus for example such devices are classified as to whether they operate in the so-called low-voltage or ionization chamber region, the proportional region, or the Geiger region. These classifications are by no means rigid and are based upon the character of the pulses and their relation to the voltage applied to said electrodes.

In other words, a detecting device consisting generally for example, of a hollow cylindrical outer electrode and a centrally located and axially aligned inner electrode, the space between said electrodes being filled with a predetermined gas, may operate as an ionization chamber at low voltages and as the voltage is progressively raised the device becomes in turn a proportional counter and a Geiger counter.

If it is assumed that the inner electrode which is generally a wire having a diameter in the neighborhood of a few thousandths of an inch, is positively charged, an ionizing event occurring in the volume of the gas defined by said electrodes will result in electrons produced in said volume being swept toward the positively charged electrode and inducing a current therein (before attachment and the formation of negative ions if the proper gas is chosen) as will be explained in greater detail later. The resulting pulse is generally amplified by suitable means and subsequently may be employed to actuate external apparatus to effect sensible counting or other recording, such as by photographs of the activating phenomena, with respect to time.

In such a counting system it must be recognized that in order to permit measurement of the voltage change occurring upon collection of either the positive ions or negative ions and electrons, a resistance is generally inserted in suitable association with the counting chamber, and that a distributed circuit capacity in conjunction with this resistance fixes the time constant of the recovery of the device after a pulse has occurred. Thus the size of the pulse appearing on the collecting electrode has been said to be determined by the number of charges arriving thereat and by the distributed capacity of said electrode and anything electrically connected to or associated therewith. That is, the time rate of change of the voltage is determined by the rapidity with which collection takes place at the collecting electrode, provided this is small compared to the time constant determined by the product of the aforesaid resistance and distributed capacity. The mobility of the particles concerned is thus seen to be an important consideration in the construction of a device and system for rapid and efficient counting of various types of ionizing event. It is now known for example that the mobility of positive ions is of the order of 1.2 to 1.4 centimeters per second per volt per centimeter in air at standard temperature and pressure whereas for electrons the mobilities are much greater and the drift velocity is between $10^3$ and $10^4$ times higher.

Devices and systems heretofore employed for the detection of ionizing events have been constructed upon the basis of the general principles hereinbefore set forth and detailed studies of their operation have revealed a number of shortcomings. Such devices generally employed the coaxial cylindrical geometry for the oppositely charged electrodes or parallel plate geometry for the same purpose and many variations of these basic forms. Various mixtures of gases have been employed in attempts to increase the efficiency of the detecting device and have been described in the literature though the reasons for employment of such mixtures has not been generally understood, nor have the mixtures been effective in reducing collection times to any important degree. Seen generally Korff Electron and Nuclear Counters, D. Van Nostrand Company, 1946. In particular, it is now well known that for certain counting device geometries, mixtures of monatomic and polyatomic gases are valuable in producing certain desirable results, e. g., in quenching a Geiger counter. Furthermore, the employment of such mixtures has generally been shown to reduce the starting potential among other factors. However, the mixtures described in the art are not based upon the considerations of the electron mobility and, as will be shown hereinafter, the employment of the gas mixtures heretofore undertaken did not increase the efficiency of the device by more than a very small factor.

It is therefore seen to be an object of the present invention to provide a highly efficient system for the detection of ionizing events.

It is a further object of the invention to provide an improved method and means for detecting an ionizing event and sensibly recording the same at high efficiencies.

It is a still further object of the present invention to provide an improved detecting system in which the resolving time is minimized.

It is another object of the present invention to provide a detecting system in which the time interval after recording an ionizing event and before the pulse produced in the system by the next ionizing event is of desired amplitude is minimized.

It is still another object of the present invention to provide detection means in which the lifetime of the counting device resulting from the employment of a polyatomic gas which disintegrates under the action of a plurality of ionizing events is a maximum.

It is still a further object of the present invention to provide novel mixtures of gases for employment in counting devices and systems.

The above mentioned objects are generally accomplished by the provision of a mixture of a monatomic gas and a polyatomic gas and more particularly predetermined percentages of argon and carbon dioxide within the sensitive volume of the detecting system, in combination with novel coupling means which reduce the transients in the detecting and recording circuits.

If a pure gas is considered in which electrons are liberated by an ionizing event in the absence of an electric field, the electrons move at random with an average energy equal to the thermal translation energy of the gas nuclei which may be denoted as $3/2kT$ in which $k$ is the Boltzmann constant and $T$ the absolute temperature. As noted hereinbefore when an electric field is applied, a drift velocity is superposed on the irregular or random motion of the electrons and their average energy is increased above the thermal value.

The average drift velocity $\omega$ of an electron in a gas composed of molecules of mass $M$, has heretofore been expressed in terms of the mean free path for scattering $L$, at unit pressure, as $$\omega = (m/8M)^{1/4}(eEL/m)^{1/2}$$

in which $m$ is the mass of an electron, $e$ is the charge and $E$ is the field. Looked at another way, the value of the drift velocity and similarly the value of the average energy of electrons in an electric field are determined by an equilibrium condition between the energy and momentum imparted by the electric field to the electrons and the energy and momentum transferred by the electrons to the gas molecules through collision.

For a given gas, the amount of energy transferred per unit time by the electrons to the gas molecules depends on the energy distribution of the electrons and for a given energy distribution it is proportional to the number of collisions per second, i. e., to the pressure. If it is assumed for the purposes of simplicity that the energy distribution of the electrons is uniquely determined by their average energy, then the average energy transfer per second may be taken equal to the pressure multiplied by the average energy transfer per second per electron in a gas at unit pressure. The momentum transfer from electrons to gas molecules on the other hand depends not only on the gas pressure and the energy distribution, but also upon the drift velocity.

From the above considerations, it is possible to set forth the equations from which the energy loss and momentum loss may be determined and from which in turn it is possible to determine the effects on electron mobility by the employment of gas mixtures, by treatment of the equations in the light of the partial pressures of the gases in the mixture.

Thus if $K(3/2kT)$ is equal to the average energy of the electrons, the symbol $K$ denoting a constant, when an electric field of strength $E$ is applied, a drift velocity $\omega$ will result. Denoting the pressure of the gas by $P$ and the average energy transfer per second per electron in a gas at unit pressure by $\epsilon$ (which is a function of $K$ and may be written as $\epsilon(K)$) then the average energy transfer per second is equal to $P\epsilon(K)$. Similarly, denoting the average momentum transfer per second for $\omega=1$ and $P=1$ as $\pi(K)$ then the average momentum transfer per second is equal to $P\omega\pi(K)$.

Under the condition that the average energy and momentum of the electrons are constant the governing equations for a pure gas are $$eE\omega = P\epsilon(K) \qquad (1)$$
$$eE = P\omega\pi(K) \qquad (2)$$

(in which $e$ is the unit charge) from which the energy and momentum losses may be calculated for the given gas if $\omega$ and $K$ are measured as functions of $\epsilon/P$.

If a mixture of gases is considered and these gases have partial pressures $P_1, P_2 \ldots P_n$, the average energy transfer per second from electrons to gas molecules in the mixture is given by $$P_1\epsilon_1(K) + P_2\epsilon_2(K) + \ldots + P_n\epsilon_n(K)$$

in which $\epsilon_1(K)$, $\epsilon_2(K)$ et cetera are the values of $\epsilon$ relative to the various gases and computed for the average electron energy $K$ which prevails in the mixture. Hence Equations 1 and 2 hold and give for a gas mixture $$\epsilon = (P_1/P)\epsilon_1(K) + (P_2/P)\epsilon_2(K) + \ldots \qquad (3)$$
$$\pi = (P_1/P)\pi_1(K) + (P_2/P)\pi_2(K) + \ldots \qquad (4)$$

in which $P$ is the total gas pressure and $\pi_1, \pi_2$ et cetera are values for $\pi$ relative to the various gases.

Therefore, if the properties of the particular gas are known (i. e. $\epsilon_1(K)$, $\epsilon_2(K) \ldots \epsilon_n(K)$; $\pi_1(K), \pi_2(K) \ldots \pi_n(K)$) as a function of $K$, then $\epsilon(K)$ and $\pi(K)$ for a mixture of the gases may be determined and Equations 1 and 2 may be employed to determine the drift velocity of the mixture.

Through the employment of such an analysis, a mixture of gases, heretofore untried, resulted in the attainment of remarkable efficiencies, as well as collection and resolution times.

In order to increase the understanding of the invention reference is made to the drawings, made part of this specification, which are given by way of example and are not intended to limit the scope thereof. In the drawings Figure 1 is a chart in which $\epsilon/e$ is plotted against $K$ for carbon dioxide, argon, and a mixture of the gases.

Figure 1:
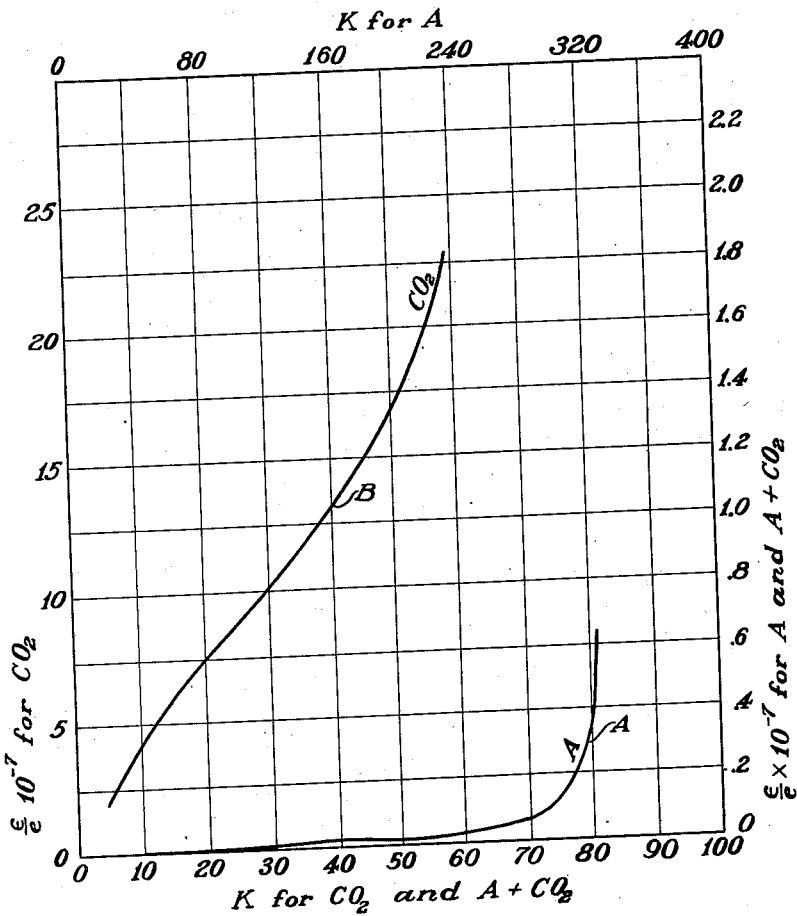
Figure 2:
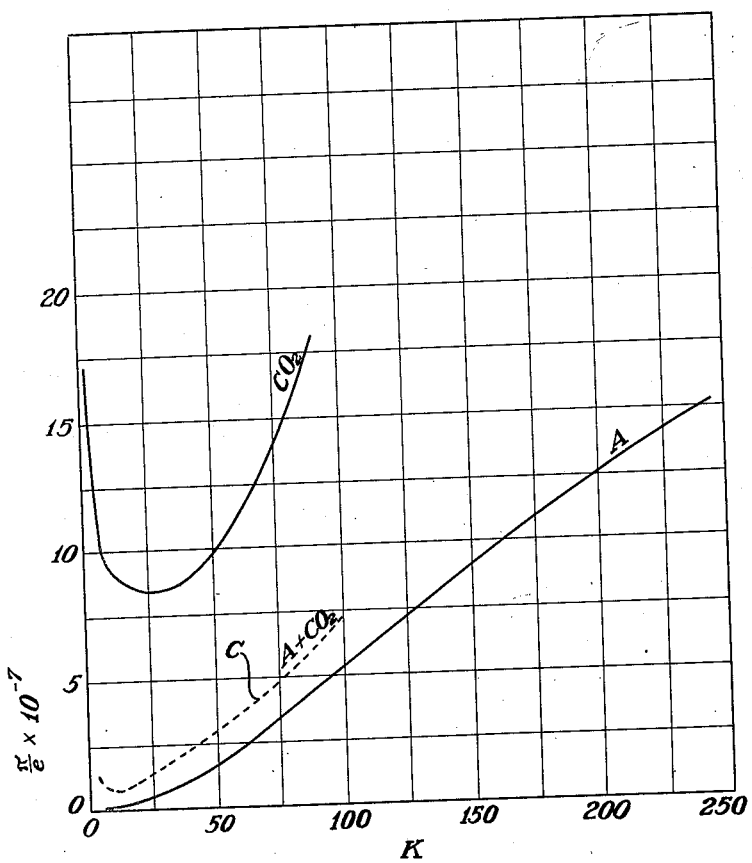
Figure 2 is a chart in which $\pi/e$ is plotted against $K$ for carbon dioxide, argon, and a mixture of the gases.

Referring now to Figures 1 and 2, the curves marked A and $CO_2$ are calculated from well-known data on electron behavior. The curve marked B in Figure 1 gives the value of $$\frac{\epsilon}{e} = 0.9(\epsilon/e)_A + 0.1(\epsilon/e)_{CO_2}$$

and the curve marked C in Figure 2 gives the value of $$\frac{\pi}{e} = 0.9(\pi/e)_A + 0.1(\pi/e)_{CO_2}$$

for the mixture. The product of these two quantities (see Equations 1 and 2 supra) gives $(E/P)^2$ as a function of K for the mixture. For example by reference to the curves in Figure 1, one finds $E/P=1$ for $K=27$ which means that $$27(3/2kT)$$

is the energy of electrons in the mixture when $E/P=1$. For $K=27$ in Figure 2

$$\frac{\pi}{e} = 1.35 \times 10^{-7}$$

from which the drift velocity can be calculated at $E/P=1$, as $$\omega = \frac{(E/P)}{(\pi/e)} = 7.4 \times 10^6 \text{ cm./sec.}$$

which should be noted to be well above the drift velocity in either argon or carbon dioxide, the values being (for $E/P=1$) $6 \times 10^{-5}$ and $5.5 \times 10^6$ centimeters per second respectively.

The physical reason for this fact can be readily understood from an analysis of the behavior of electrons in the two gases. Figure 1 shows that the energy loss of electrons in argon is very small until K reaches a value of about 270 (which corresponds to 10 E. V.) and then starts rising abruptly, while in $CO_2$ the energy loss is already large for small values of K and rises steadily with increasing K.

This is due to the fact that in argon no inelastic collisions occur unless the electrons have an energy larger than the first excitation level, which is of the order of 10 E. V. In $CO_2$ however inelastic collisions occur very frequently even at small electron energies, because of the large number of low excitation levels of the $CO_2$ molecule. It follows that in pure argon even with moderate values of $E/P$, the average electron energy is quite high, i. e., of the order of 10 E. V. Addition of 10 percent $CO_2$ cuts down this energy very considerably (to about 1 volt with $E/P=1$).

On the other hand, Figure 2 shows that the average momentum loss in argon decreases rapidly with decreasing electron energy. This is essentially due to the decrease of the elastic scattering cross-section with energy, known as the Ramsauer effect. The momentum loss in the mixture of $0.9A + 0.1 CO_2$ is not very different from the momentum loss in pure A, on account of the small proportion of $CO_2$. Hence one can say that the main effect of a small addition of $CO_2$ to A is to bring the average electron energy from a high value, for which $\pi$ is large, to a low value, for which $\pi$ is small. This increases the electron mobility because this quantity is inversely proportional to $\pi$.

As compared with pure $CO_2$, the drift velocity in the mixture is larger because the $CO_2$ is more diluted. In other words the drift velocity that one obtains in one atmosphere of 0.9 A plus 0.1 $CO_2$, with a given electric field, is not much smaller than the mobility that one would obtain with the same field in 0.1 atmosphere of $CO_2$ alone.

Figure 3:
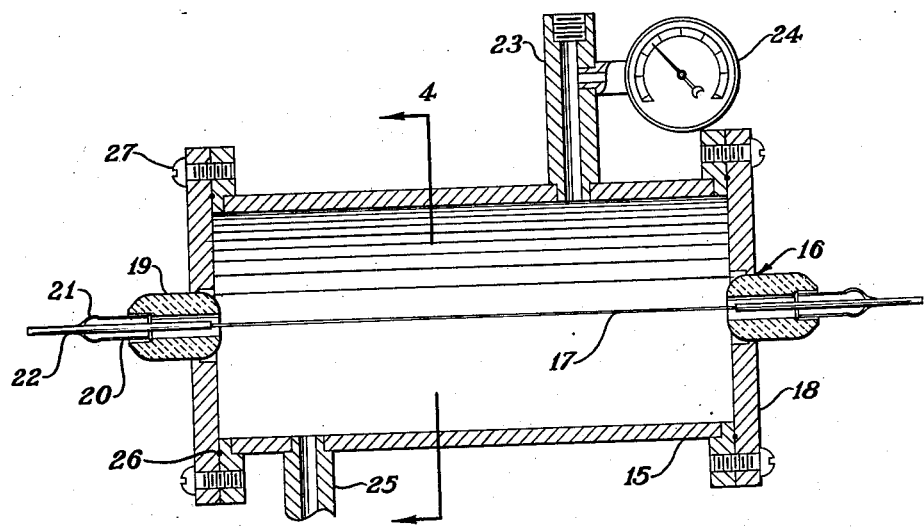
Figure 3 is a longitudinal sectional view of one type of cylindrical ionization chamber employing the novel gas mixture of the present invention.
Figure 4:
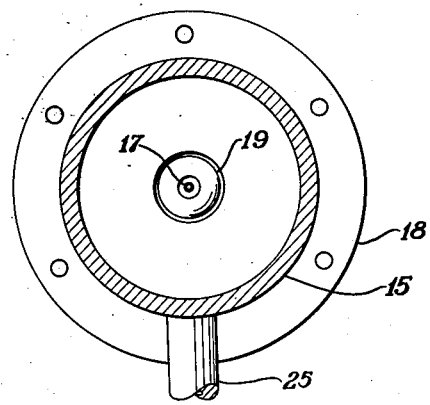
Figure 4 is a transverse view of the same chamber taken on the line 4—4 in Figure 3.

Referring now to Figures 3 and 4, a cylindrical detecting or counting chamber is seen to comprise an outer tubular electrode 15 provided with flanged ends, a supporting structure generically designated by reference numeral 16, each of said flanged ends being employed for maintaining the filamentary electrode 17 in spaced relationship with said tubular electrode 15. Said supporting structure 16 comprises an end plate 18 provided with an aperture in which is accommodated a suitable sealing plug 19 such as a porcelain and Kovar assembly which permits soldering of the plug 19 to the plate 18, thereby permitting the formation of a pressure tight junction, said plug 19 being bored to receive the sleeve 20 which is made integral with the glass sealing bead 21 and the tubular lead-through member 22; the entire assembly being such that the lead-through member 22 is maintained in spaced relationship with the sleeve 20 and the plug 19 respectively. Because the tubular electrode 15 is maintained at a high negative potential for purposes of circuit simplicity, as will be explained at greater detail later, the employment of the type of assembly shown is desirable to prevent leakage pulses between the said electrode 15 and the electrode 17 from appearing in the system, which is done by the simple expedient of grounding the sleeve 20. Thus, any leakage pulses across the insulating plug 19 are passed to ground before they reach the collecting electrode 17, which is maintained essentially at ground potential.

A coupling 23 is made integral with the tubular electrode 15 and accommodates a pressure gauge 24 so that the gas pressure within the device may be read at all times; said coupling member also being adapted to receive a suitable valve not shown and circulating tube which together with tube 25 form part of the gas circulating and purifying system. This system generally comprises a sealed tank in which quantities of a suitably dried and degassed purifying agent such as calcium is maintained at slightly elevated temperatures. A circular gasket 26 is preferably inserted between the cover plate 18 and the flanged ends of the tubular electrode 15 to effectively seal the junction between said members when closure screws 27 are drawn up tightly.

In such a chamber it is now well established that the gas multiplication (i. e., the ratio of the total number of charges collected by the collecting electrode 17 to the number of ion pairs produced by the ionizing particle or event) will be a function of the diameter of the wire electrode 17, the diameter of the tubular electrode 15, the voltage across the device, that is between said electrodes 15 and 17, and the pressure. The nature of the tubular electrode may also influence the gas multiplication if the photo-electric effect on the walls plays an important role. However, disregarding this phenomena, the significant parameters for gas multiplication are concerned with phenomena which take place within a small distance from said electrode 17, which distance is up to a few times the radius of this electrode.

The current in an ionization chamber in which it is assumed there is no electron attachment, is carried partly by the electrons and partly by the positive ions. The motion of both the ions and the electrons induces charges on the collecting electrode, and if both electrodes of the chamber are connected by a conductor a current will flow. This total ionization current may be thought of as the sum of two currents, I+ and I−, the former due to the motion of the positive ions and the latter due to the motion of the electrons. In a steady state with the gas throughout the chamber being uniformly ionized, these two currents, I+ and I−, may or may not be equal depending upon the geometry of the chamber. For a parallel plate chamber they are equal. In the case of a cylindrical chamber, with a central electrode which collects the electrons, the current resulting from the motion of the positive ions is less than the current due to the electrons. It can be shown that the ratio $$\frac{I^-}{I^+ + I^-} = 1 - \frac{1}{2 \log (b/a)} \text{ (for } b \gg a\text{)}$$

where $a$ and $b$ are the radii of the inner and outer electrodes, respectively. The difference between I+ and I− can be simply explained by an energy consideration. Their ratio depends upon the relative amount of work done in removing the electrons and in removing the positive ions from the collecting volume of the chamber. Since the electrons all move in the direction of higher fields, and the positive ions all move in the direction of weaker fields, more work is done in collecting the electrons than in collecting the positive ions. Thus for the case of a chamber constructed as above described but in which the inside diameter of the tubular electrode 15 is 1.94 inches and the outside diameter of the wire collecting electrode 17 is 0.025 inch, I− is about 88% of the total current and extremely short resolution times are possible.

Figure 5:
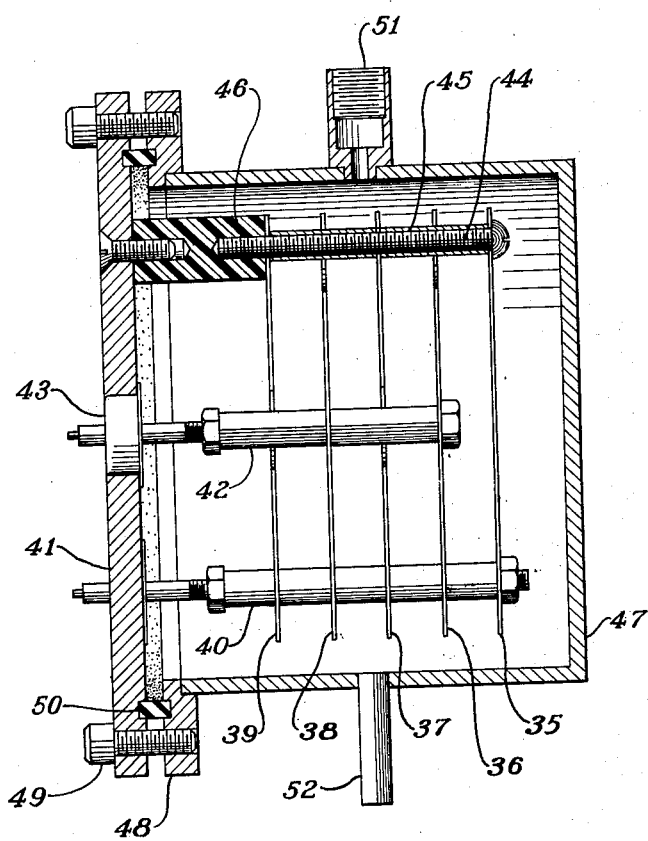
Figure 5 is a vertical sectional view of a parallel plate chamber in which the novel gas mixture is employed.

An alternate embodiment of a fast ionization chamber employed for such observations as for example the shape of an X-ray pulse of one microsecond duration is shown in Figure 5. The electrode assembly consists of five circular disks of one millimeter thick aluminum, i. e., the disks 35 through 39. Alternate disks, that is, disks 35, 37 and 39 are in conducting relationship with the supporting stud 40 which is of a conducting material and traverses the closure plate 41 and is rigidly mounted therein by means of an insulated bushing, not shown, to be electrically connected to a source of negative high voltage, for example minus 2,000 volts D. C. Disks 36 and 38 are in conducting relationship with the supporting post 42 which also passes through an insulating seal (indicated at 43) to permit a suitable connection to be made with an electric amplifier. Suitable apertures are provided in plates 37 and 39 to permit the passage therethrough of supporting post 42 and similarly apertures are provided in plates 36 and 38 to permit the passage therethrough of post 40. Stud 44 is also provided to add rigidity to the assembly by passing through the sleeve 45 which is soldered or otherwise rigidly connected to each of plates 35, 37 and 39. The insulating block 46 which acts as a support for said stud 44 serves to maintain the insulating relationship between the said negatively charged plates and the drum-like outer casing 47.

This outer casing 47 is provided with a flange 48 having drilled openings to accommodate the closure screws 49 as well as a recessed annular space in which the circular gasket 50 is accommodated. The complete assembly or container 47 and cover plate 41 is adapted to be sealed in a gas tight manner so that the active volume between the oppositely charged disks 35, 37 and 39 may be filled with a suitable gas. Inlet tube 51 and outlet tube 52 serve to permit such filling and circulation of the gas through a convenient or suitable purified tank not shown in the drawing.

Figure 6:
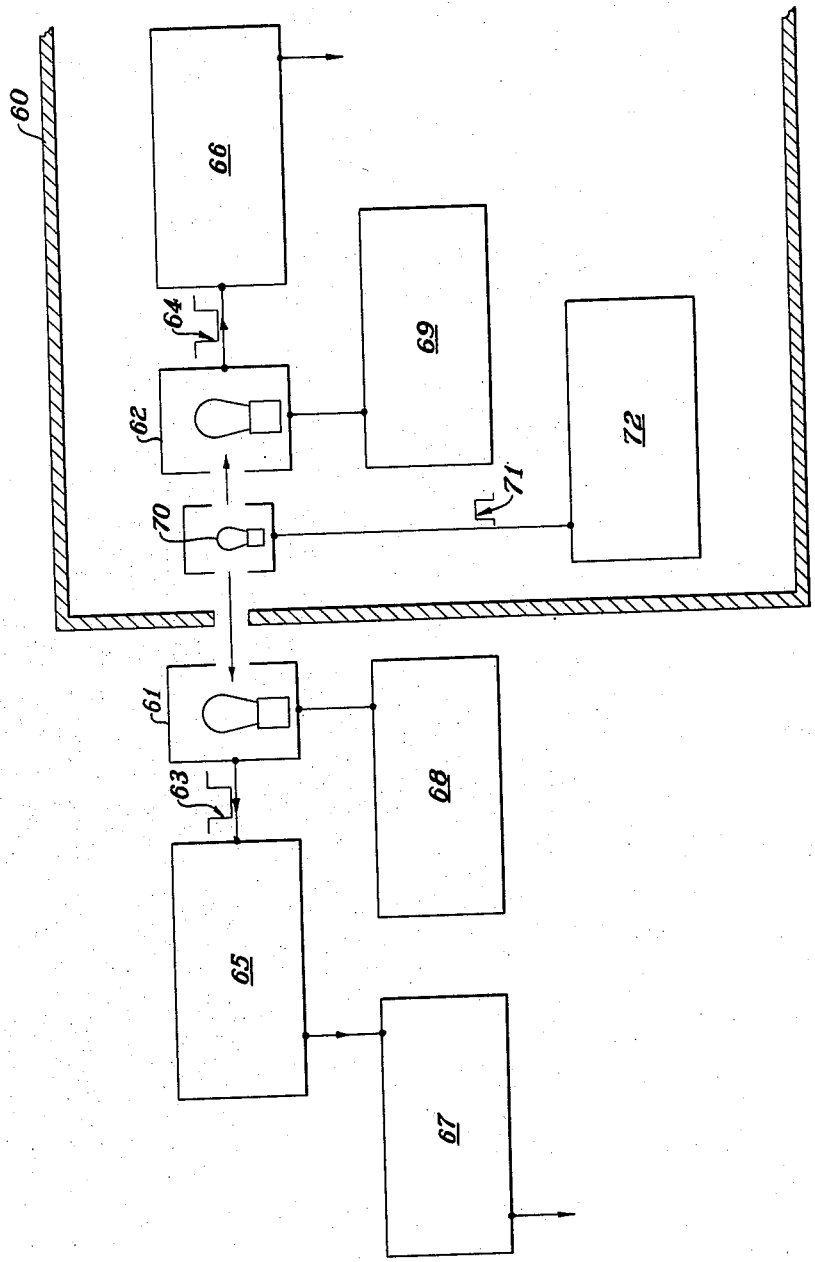
Figure 6 is a schematic diagram of a preferred type of detecting and recording system.

The gas mixture employed in such a chamber, following the principles of the present invention, is argon and carbon dioxide, 90% of the former being employed and 10% of the latter. In operation at a pressure of 100 centimeters of mercury of said mixture in the chamber and a voltage between the successive electrodes of about 2,000 volts, electrons liberated by the occurence of an ionizing event, e. g., an X-ray pulse of short duration, can be collected in 0.2 microsecond and an accurate indication of the shape of said pulse obtained. It is preferred in an application of the ionization chamber such as shown in Figure 5 to employ a triggering system such as shown in Figure 6 to prevent interference in the recording means employed, by the transients incident to the operation of the surge generator employed for producing the X-ray pulses.

The systems, that is the triggering system for the X-ray generator and the triggering system for the sensible recording means, for example a cathode ray oscilloscope, are separated by a copper cage 60, the latter system being housed within said cage 60 and the former system to the outside thereof. The two triggering systems are substantially identical, each being provided with a phototube or other light sensitive means such as tubes 61 and 62 which produce negative gate pulses of the type indicated at 63 and 64. These pulses are amplified in the amplifiers 65 and 66 and are fed as a positive triggering pulse to the X-ray device and oscilloscope respectively. That is, the output from amplifier 65 is fed through a delay unit 67 to the X-ray machine and the output of the amplifier 66 is fed directly to the oscilloscope not shown. Voltage supplies 68 and 69 provide the necessary voltages for the operation of phototubes 61 and 62 respectively. The triggering impulse for phototubes 61 and 62 is supplied by light emitted by the neon tube 70 in response to the positive impulse indicated at 71 developed in the triggering circuit 72. The above system is not described in all the details of the various circuits included therein since these are well known to persons skilled in the art. However, the employment of two phototubes activated by a single light source such as the neon tube 70 permits efficient operation of the counters of the type herein disclosed and the schematic description above given of the said triggering system is believed to be sufficient to indicate the mode of operation.

It has been shown by calculations and considerations beyond the scope of the present invention that through the employment of such an ionization chamber as described in Figure 5, it is possible not only to obtain an indication of the energy of the ionizing event but also to determine the path of the particle or radiation involved. Such an analysis requires the visual recording of the pulse shape produced by electron collection at plates 36 and 38, suitable means being a cathode ray oscilloscope and photographic means operated in connection therewith. By differentiation of the said pulse and determination of the slopes thereof, the energies may be readily obtained. Furthermore, by recording the height of the pulse, the exact path of the ionizing particle or radiation can be ascertained.

It is thus seen that what has been described is a novel mixture of monatomic and polyatomic gas for use in devices for detecting various types of ionizing events, the particular limitations on the mixture being determined by a maximized drift velocity of electrons therein under the influence of comparatively small electric fields. If one adopts the approach in which the drift velocity $\omega$ is said to be proportional to $L/v$ in which $L$ is the length of the mean free path and $v$ the velocity of thermal agitation, the mixture of gases proposed herein is one in which the value of $L/v$ is maximized. Two gases, mixtures of which have been found suitable for this purpose are argon and carbon dioxide.

While specific examples have been given hereinbefore and data concerned with specific mixtures of said two gases have been presented, the invention is clearly not limited to these mixtures since they were given solely as illustrations of the properties of said mixture. Percentages of carbon dioxide as low as 0.5% and as high as 20% have been found useful for the purposes stated, the particular percentage chosen being dependent upon the applied voltages between electrodes in the detecting device, the pressure at which the gaseous mixture is maintained in said device and the type of event which is to be detected and/or analyzed. As a practical lower limit of the percentage of carbon dioxide to be employed in a chamber in which continuous circulation and purification of the gas is provided, it has been found preferable to use about 2% of said polyatomic gas, since losses occur by reason of said purification step.

It is therefore intended that no limitaton be placed upon the scope of the invention by reason of the illustrative examples depicted and described herein except as such limitations may appear in the appended claims.

What is claimed is:

1. The method of detecting the occurrence of ionizing events which comprises subjecting a gaseous mixture containing at least 80% by pressure of argon and not more than 20% by pressure of carbon dioxide to at least a portion of the ionizing effect of said event, collecting electrons resulting therefrom by the application of an electric field maintained at a value below that at which electron multiplication takes place and sensibly indicating the amount of electron collection as a function of time.

2. The combination with a device for detecting the occurrence of an ionizing event which comprises at least two oppositely charged electrodes which define the active volume of said device, the potential difference between said electrodes being less than the value at which the electron multiplication occurs, of a gaseous mixture containing at least 80% by pressure of argon and not more than 20% by pressure of carbon dioxide accommodated within the zone defined by said electrodes.

JAMES S. ALLEN.
BRUNO B. ROSSI.

REFERENCES CITED

The following references are of record in the file of this patent:

UNITED STATES PATENTS

| Number | Name | Date |
|---|---|---|
| 2,289,926 | Neufeld | July 14, 1942 |